(12) United States Patent
Ganev et al.

(10) Patent No.: US 8,125,747 B2
(45) Date of Patent: Feb. 28, 2012

(54) METHOD FOR MITIGATING NEGATIVE SEQUENCE EFFECT RESULTING FROM NON-SYMMETRICAL SHORT CIRCUIT FAILURE OF SYNCHRONOUS ELECTRIC MACHINE BASED SYSTEMS

(75) Inventors: Evgeni Ganev, Torrance, CA (US); Leroy Allen Fizer, Huntington Beach, CA (US); Cuong Nguyen, Redondo Beach, CA (US); Thay Chau, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 466 days.

(21) Appl. No.: 12/405,123

(22) Filed: Mar. 16, 2009

(65) Prior Publication Data

US 2010/0232076 A1 Sep. 16, 2010

(51) Int. Cl.
H02H 7/08 (2006.01)
(52) U.S. Cl. ............... 361/23; 361/18; 361/24; 361/25; 361/30; 361/6; 318/432; 318/434; 318/471; 324/500; 323/277; 323/284; 323/285; 702/132; 363/135; 363/57
(58) Field of Classification Search .......... 318/432, 318/434, 471, 400.28, 400.27, 400.21, 400.22; 361/18, 23, 24, 25, 30, 31, 5, 6, 87, 93.1, 361/91.1, 91.2, 42; 324/500, 509, 512, 546, 324/764.01, 765.01; 323/277, 284, 285, 323/220, 221, 222, 223; 702/132; 363/135, 363/57
See application file for complete search history.

(56) References Cited

U.S. PATENT DOCUMENTS

| | | | | |
|---|---|---|---|---|
| 4,931,715 A * | 6/1990 | Lee et al. | | 318/709 |
| 6,369,543 B1 * | 4/2002 | Masselus et al. | | 318/700 |
| 6,573,681 B2 * | 6/2003 | Schwesig | | 318/801 |
| 6,683,435 B1 * | 1/2004 | Liang et al. | | 318/727 |
| 6,720,749 B2 * | 4/2004 | Ta et al. | | 318/434 |
| 7,116,083 B2 * | 10/2006 | Kalman et al. | | 322/59 |
| 7,276,871 B2 * | 10/2007 | Ganev et al. | | 318/434 |
| 7,279,862 B1 * | 10/2007 | Welchko et al. | | 318/564 |
| 7,372,712 B2 * | 5/2008 | Stancu et al. | | 363/71 |
| 7,450,406 B2 * | 11/2008 | Glauser | | 363/71 |
| 7,652,858 B2 * | 1/2010 | Tang et al. | | 361/33 |
| 7,759,888 B2 * | 7/2010 | Matsui et al. | | 318/400.29 |
| 7,944,160 B2 * | 5/2011 | Hiti et al. | | 318/400.02 |
| 7,973,533 B2 * | 7/2011 | Ausman et al. | | 324/415 |
| 7,990,093 B2 * | 8/2011 | Kezobo et al. | | 318/432 |
| 2008/0129307 A1 | 6/2008 | Yu et al. | | |
| 2008/0304189 A1 | 12/2008 | Tang et al. | | |

OTHER PUBLICATIONS

Brial A. Welhko et al.; IPM Synchronous Machine Drive Response to Symmetrical and Asymmetrical Short Circuit Faults; IEEE Transactions on Energy Conversion; vol. 18 No. 2, Jun. 2003.

* cited by examiner

*Primary Examiner* — Rita Leykin
(74) *Attorney, Agent, or Firm* — Robert Desmond, Esq.

(57) ABSTRACT

A drive system for a multi-phase electric machine with a permanent magnet rotor, the drive system may comprise conduction paths for each phase. Detectors on each of the conduction paths may determine electrical condition of the conduction path. At least one selectable interconnection path may be present between all of the conduction paths and at least one selectable interconnection path may be operable to connect all of the conduction paths together responsively to at least one of the detectors determining that the electrical condition of its respective electrical path is representative of a predetermined electrical fault condition so that heating of the rotor during continued rotation of the rotor is prevented.

16 Claims, 8 Drawing Sheets

METHOD FOR MITIGATING NEGATIVE SEQUENCE EFFECT RESULTING FROM NON-SYMMETRICAL SHORT CIRCUIT FAILURE OF SYNCHRONOUS ELECTRIC MACHINE BASED SYSTEMS

BACKGROUND OF THE INVENTION

The present invention generally relates to methods and apparatus for controlling multi-phase electric machines and, more particularly, protecting such machines from damage that may result from non-symmetrical short circuit failures.

In many electric machine applications it is desirable to employ a synchronous machine with a permanent magnet rotor. Such a machine may be referred to as a permanent magnet machine (PMM). While a PMM may have advantageous features, it has a disadvantageous feature that has heretofore limited its use in some applications.

Rotor flux in a PMM is fixed and cannot be controlled or disengaged when a short circuit occurs. Unlike other electric machines where excitation of the rotor flux can be controlled and even shutdown quickly, a PMM continues to generate electromagnetic flux until the rotor stops. Therefore, a PMM may present a hazard in some applications in which rotor speed may not be quickly reduced in the event of a short-circuit failure.

Some specialized PMM's have been designed so that they may tolerate some short-circuit failures with continuing rotation of a rotor. For example, a high-reactance permanent magnet machine (HRPMM) may internally limit the phase current magnitude, should it become shorted. The high reactance nature of this type of machine sustains short circuit currents either indefinitely, within the thermal limits of the system, or until the rotor speed can be reduced to zero. This fault protection method may accommodate a so called, bolted short or symmetrical short, i.e. all phases of the machine connected together electrically. However, in some instances a short circuit may develop in a single phase, between two phases or as an intermittent fault rather than as a symmetrical short. Such a failure may be referred to as a non-symmetrical short circuit failure (NSSCF). A NSSCF may create negative sequence flux that may produce overheating of the rotor assembly.

It may be seen that there is a need to provide a PMM which may tolerate a NSSCF with continued rotor rotation. There is a need for such a PMM which may tolerate occurrence of a NSSCF without experiencing destructive overheating of the rotor assembly.

SUMMARY OF THE INVENTION

In one aspect of the present invention, a drive system for a multi-phase electric machine with a permanent magnet rotor, the drive system comprising conduction paths for each phase; detectors on each of the conduction paths for determining electrical condition of the conduction path; at least one selectable interconnection path between all of the conduction paths; and at least one selectable interconnection path being operable to connect all of the conduction paths together responsively to at least one of the detectors determining that the electrical condition of its respective electrical path is representative of a predetermined electrical fault condition so that heating of the rotor during continued rotation of the rotor is prevented.

In another aspect of the present invention, a multi-phase electric machine drive system in a non-detachable relationship with a high-inertia load and/or a prime mover comprises a rotor; a stator; detectors for detecting an electrical fault in a conduction path of each phase; and a controller for electrically interconnecting all of the conduction paths responsively to detection of a fault in any of the conduction paths so that any negative sequence flux resulting from the fault and continued rotation of the rotor is converted to positive sequence flux.

In still another aspect of the present invention a method for controlling a synchronous electric machine comprises the steps of; rotating a rotor of the electric machine; transferring current to or from stator windings, said transferring being performed on multiple conduction paths; monitoring each of the conduction paths individually for presence of a predetermined electrical fault condition; and electrically interconnecting all of the conduction paths in a presence of the predetermined fault condition on any one or more of the conduction paths to assure that negative sequence currents do not produce heating of the rotor.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention may be useful in electric machine applications. More particularly, embodiments of the present invention may provide for control of an electric machine with a permanent magnet rotor which may allow the electric machine to experience a NSSCF without experiencing destructive overheating of the rotor. Embodiments of the present invention may be particularly useful in applications in which a rotor of the electric machine may continue its rotation even after a NCSSF occurs, e.g., a PMM connected directly to a load with high rotational inertia.

Figure 1A:
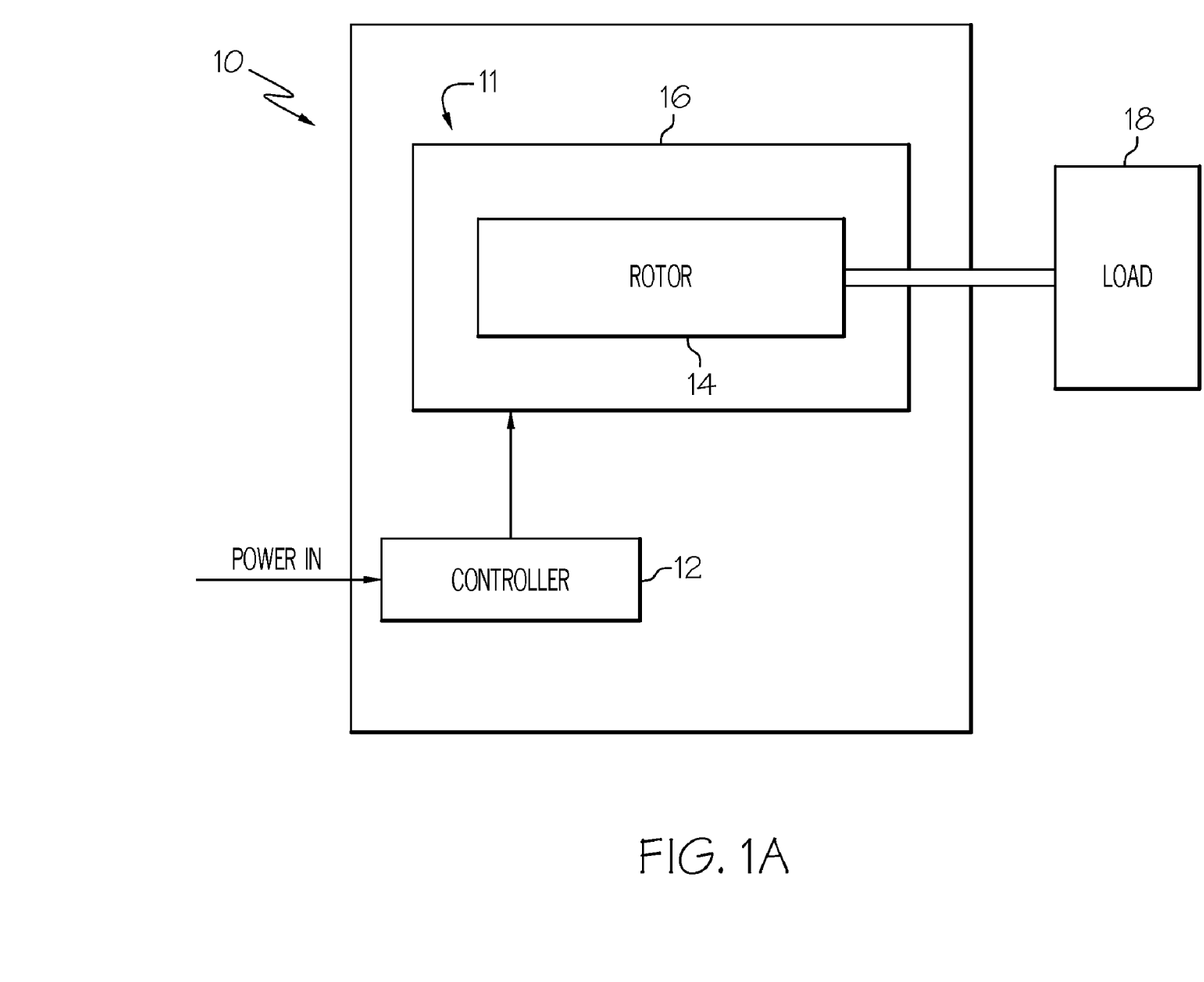
FIG. 1A is a block diagram of a drive system in a motor configuration in accordance with an embodiment of the present invention.
Figure 1B:
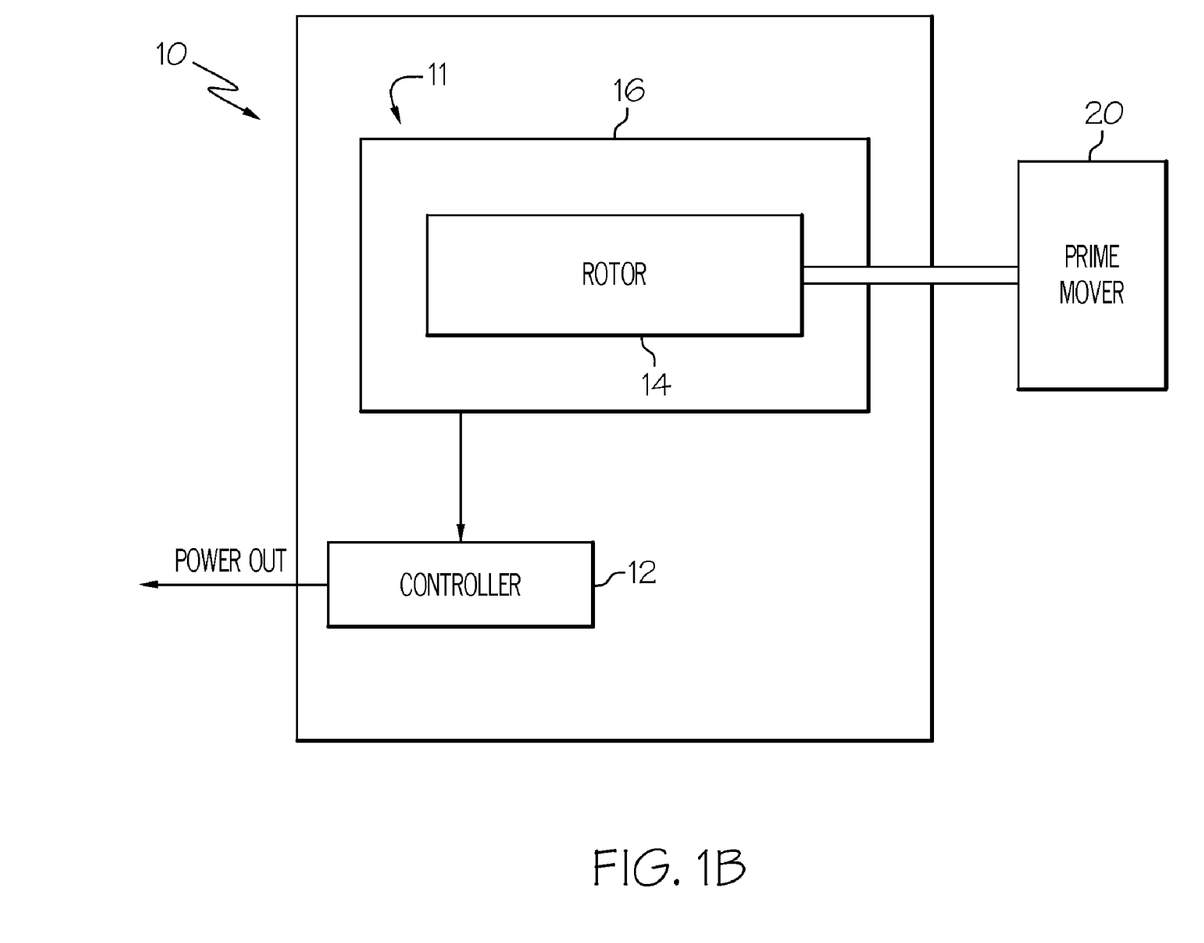
FIG. 1B is a block diagram of a drive system in a generator configuration in accordance with an embodiment of the present invention.

Referring now to FIGS. 1A and 1B, block diagrams may portray exemplary embodiments of the invention. An electric drive system 10 may comprise an electric machine 11 and a controller 12. The electric machine 11 may comprise a rotor 14 and a stator 16. In FIG. 1A, the rotor 14 of the electric drive system 10 may be directly connected to drive a load 18. In FIG. 1B, the rotor 14 may be connected to a prime mover 20 which may drive the electric drive system 10 as a generator. The controller 12 may control current into or out of the stator 16. The electric machine 11 may be a high-reactance permanent magnet machine (HRPMM) which may internally limit phase current magnitude, in the even of a short circuit. One example of such a HRPMM and a method of limiting phase current is described in U.S. Pat. No. 7,116,083 (G. Kalman et al., Oct. 3, 2006) which is incorporated herein by reference. The high reactance nature of this type of machine may sustain short circuit currents in its windings either indefinitely, within the thermal limits of the system, or until the rotor speed can be reduced to zero.

Figure 2:
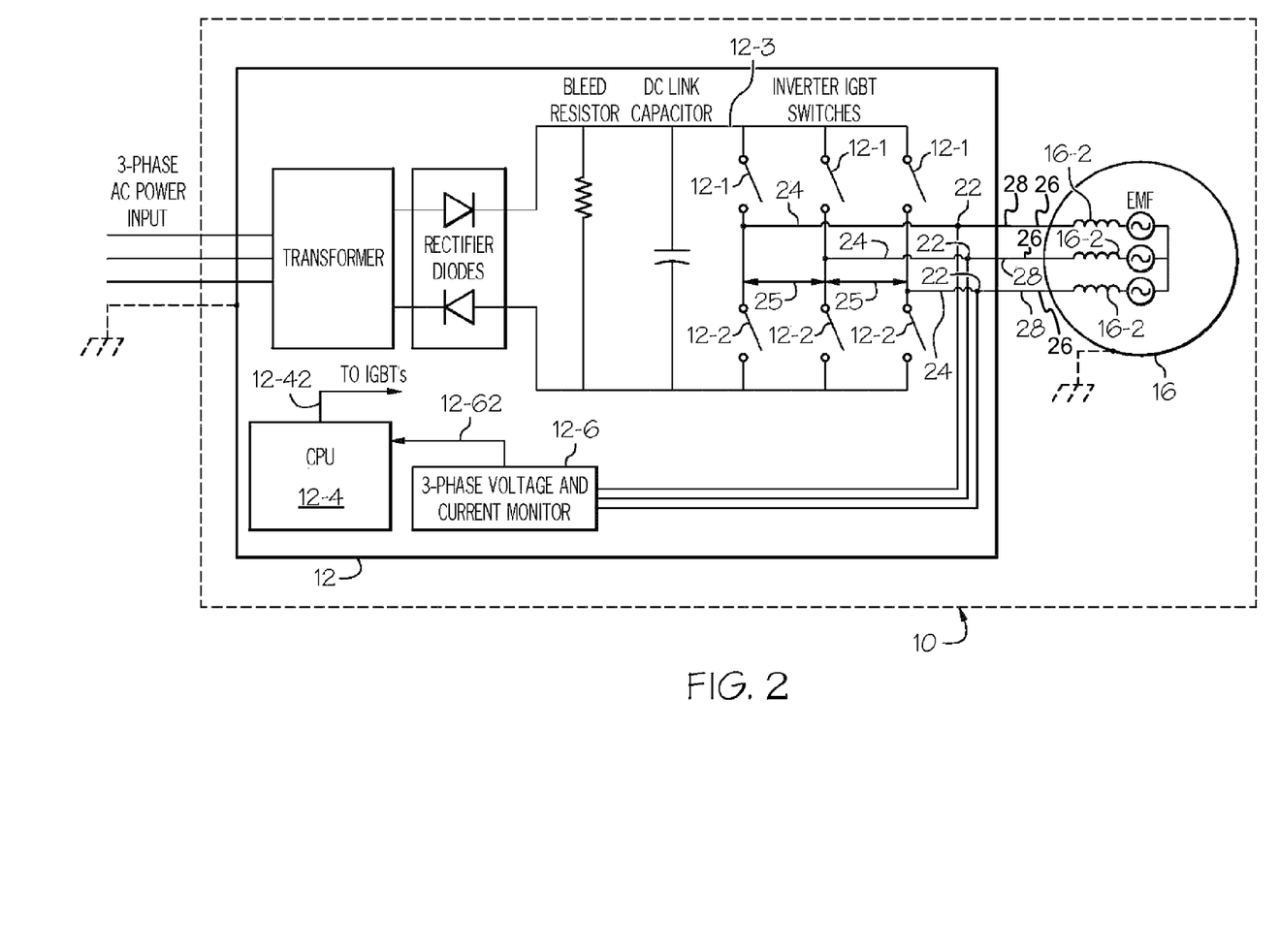
FIG. 2 is a detailed block diagram of the drive system of FIGS. 1A and 1B in accordance with an embodiment of the present invention.

Referring now to FIG. 2, a block diagram may illustrate a relationship between the controller 12 and the stator 16 of the electric machine 11 in an embodiment of the invention. The controller 12 may comprise an inverter constructed with solid state inverter switches 12-1 and 12-2 which may control current to or from the stator 16. The inverter switches 12-1 and 12-2 may be selected from among numerous conventional solid state switching devices such as metal-oxide silicon field effect transistors (MOSFET's) or insulated gate bipolar transistor (IGBT's). In the exemplary embodiment of the invention shown in FIG. 2, the inverter switches 12-1 and 12-2 may be IGBT's and they may be employed to operate in a three-phase power control mode. Timing and sequence of operation of the IGBT's 12-1 and 12-2 may be controlled through software in a processor 12-4. During normal or steady-state operation of the electric drive system 10, the IGBT's 12-1 and 12-2 may be controlled in a conventional manner. In an exemplary embodiment of FIG. 2, the inverter may be a three-phase bridge inverter 12-3.

A phase-specific conduction path 24 may carry current to or from a stator winding 16-2 of the electric machine 11 for each phase. Each of the conduction paths 24 may comprise a machine terminal 26, a feeder 28 and one of either the IGBT's 12-1 or the IGBT's 12-2. A detector 22 may be positioned on each of the conduction paths 24.

The controller 12 may be provided with a current and voltage monitoring circuit 12-6 which may be connected to the feeders 28. In the event of an electrical fault in any one or more of the conduction paths 24, the monitoring circuit may provide a fault signal 12-62 to the processor 12-4. The monitoring circuit 12-6 may be constructed to be responsive to one or more predetermined types of electrical fault conditions. The electrical fault condition may be an actual short circuit fault in one or more of the IGBT's 12-1 or 12-2, one or more of the windings 16-2, or one or more of the feeders 28. The detected electrical fault condition may be a precursor to an actual short circuit fault. For example, the electrical fault condition may be detected as an arc fault that may be detected in a manner described in US Patent Application Publication 2008/0129309 (W. Yu, Jun. 5, 2008) which publication is incorporated herein by reference.

Upon detection of one or more of the predetermined electrical fault conditions, the processor 12-4 may provide gating instruction 12-42 for the IGBT's 12-1 and/or 12-2 so that all three phases may be shorted together to produce a so-called bolted short. In other words, a symmetrical short circuit fault (SSCF) may be produced responsively to detection of any of the predetermined electrical faults conditions, even a NSSCF. The processor 12-4 may provide gating instructions 12-42 which may result in simultaneous closing of all of the IGBT's 12-1 or all of the IGBT's 12-2 to produce an interconnection path 25 among all of the conduction paths 24. The interconnection path 25 may thus be seen to comprise a selectable interconnection path.

If an electrical fault occurs in a current path 24 in which one of the IGBT's 12-1 is present, then all of the IGBT's 12-1 may be closed. Conversely, if an electrical fault occurs in a current path 24 in which one of the IGBT's 12-2 is present, then all of the IGBT's 12-2 may be closed. Also, the processor 12-4 may be programmed so that, in the event of an electrical fault in one or more of the machine terminals 26, one or more of the feeders 28 or one or more of the stator windings 16-2, the IGBT's 12-1 and 12-2 may be alternately opened and closed to optimize distribution of losses.

It has been found that phase currents may rise when a single phase or NSSCF is converted to a SSCF. However, any undesirable effects of such current rise may be offset by the desirable effects of eliminating negative sequence flux that may arise in the continuously rotating rotor 14 during a NSSCF. In the event of a SSCF, positive sequence flux may occur in the rotor 14. Positive sequence flux may not produce currents in the rotating rotor 14. Negative sequence flux, on the other hand, may produce current in the rotor 14. In most PMM's, rotors may have a high resistivity, typically equivalent to that of iron. Current produced by negative sequence flux may produce heating in the rotor 14. This heating may continue for as long as the rotor 14 may rotate in the presence of a NSSCF. When the NSSCF is converted to a SSCF, the negative sequence flux may be converted to a positive sequence flux and the undesirable heating of the rotor may stop; even though the rotor may continue its rotation.

Figure 3A:
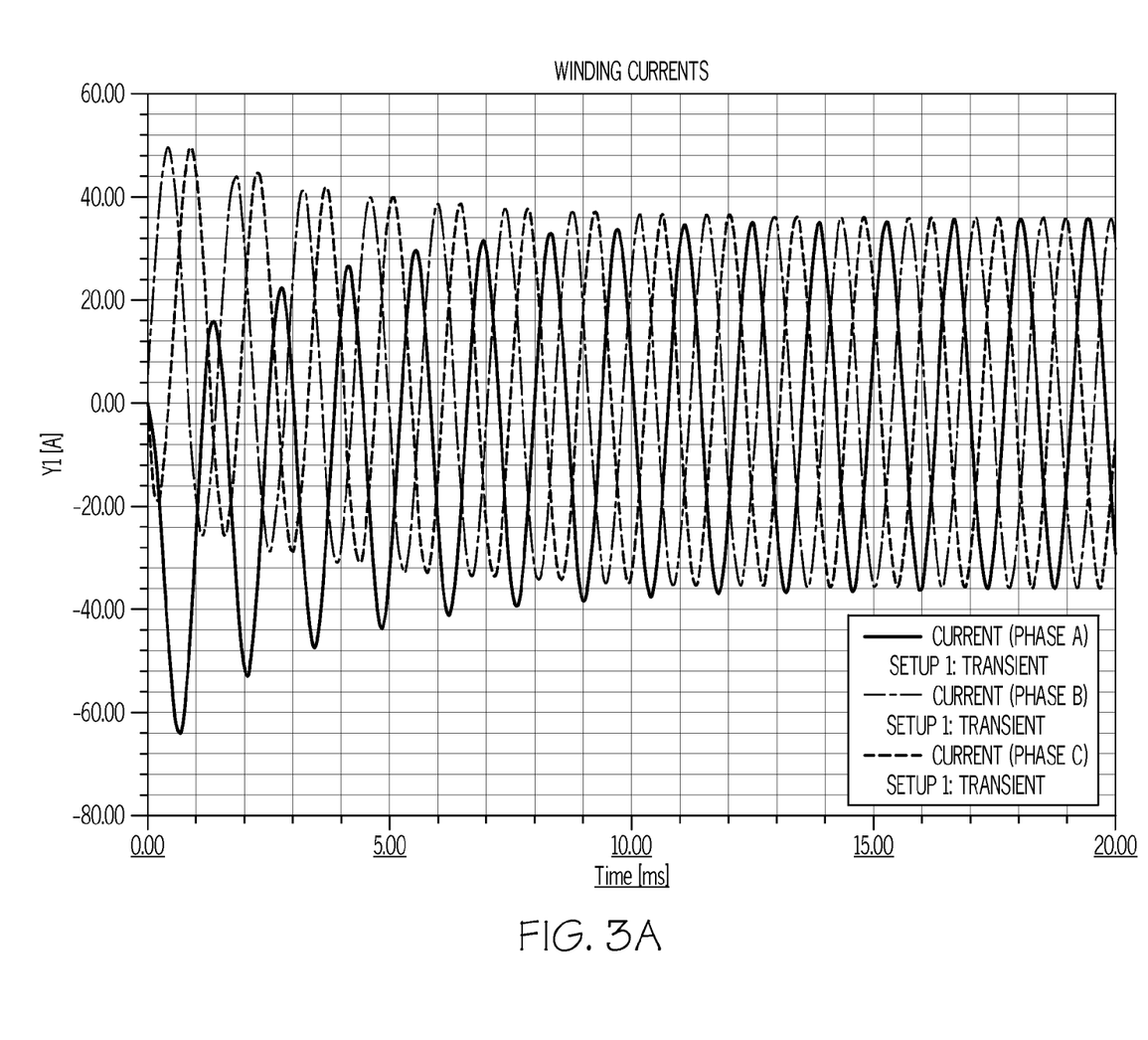
FIG. 3A is graph plot of motor current vs. time for a simulated three phase symmetrical short in accordance with an embodiment of the present invention.
Figure 3B:
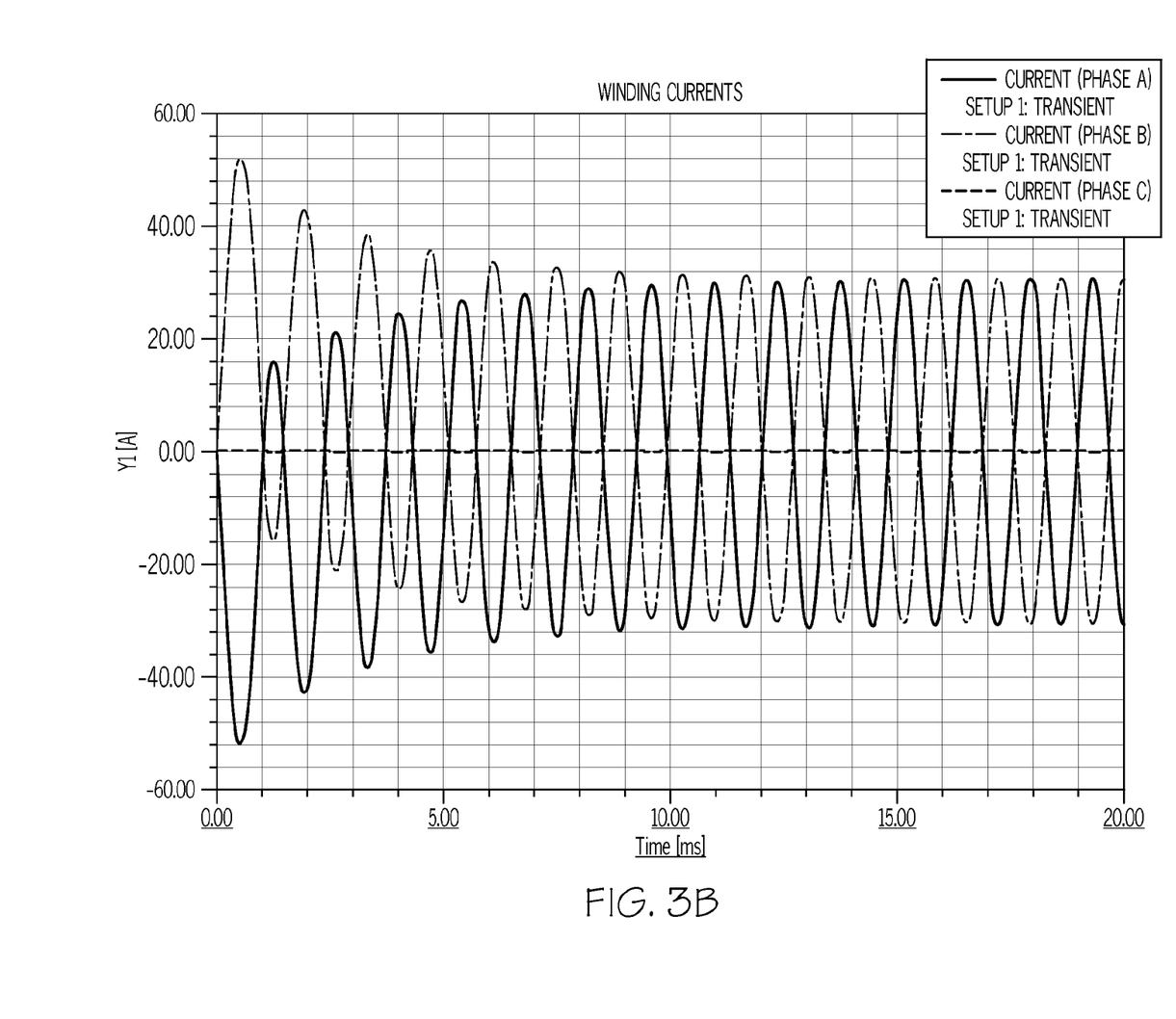
FIG. 3B is a graph plot of motor current vs. time for a simulated non-symmetrical short in accordance with an embodiment of the present invention.

As mentioned above, a phase current rise may occur when the NSSCF is converted to the SSCF. However, simulation results have shown that this phase current rise is well within a manageable range in a typical HRPMM. An analysis was performed on a three-phase, HRPMM machine. The machine was rated 128/222 VAC, 4 HP, 10800 rpm, and was an 8-pole, 24-slot, interior surface magnet rotor type machine. No-load, three-phase symmetrical short circuit, and line-line non-symmetrical short circuit conditions were analyzed. Faulted circuit analyses were initiated at no-load and winding resistance was included. Finite element (FE) software was used to model and analyze motor performance. Short circuit currents versus time are shown in FIGS. 3A and 3B. Results for transient and steady state fault currents are shown in Table 1.

TABLE 1

|  | Peak Transient Phase Current (0-to-peak Amperes) | Steady-state Phase Current (0-to-peak Amperes) |
| --- | --- | --- |
| 3-phase symmetrical fault | 63.3 | 35.6 |
| Line-line non-symmetrical fault | 51.7 | 30 |

It may be seen from Table 1 that peak transient phase current rose about 22% upon conversion of the NSSCF to the SSCF. The steady state phase current rose about 19%.

Figure 4:
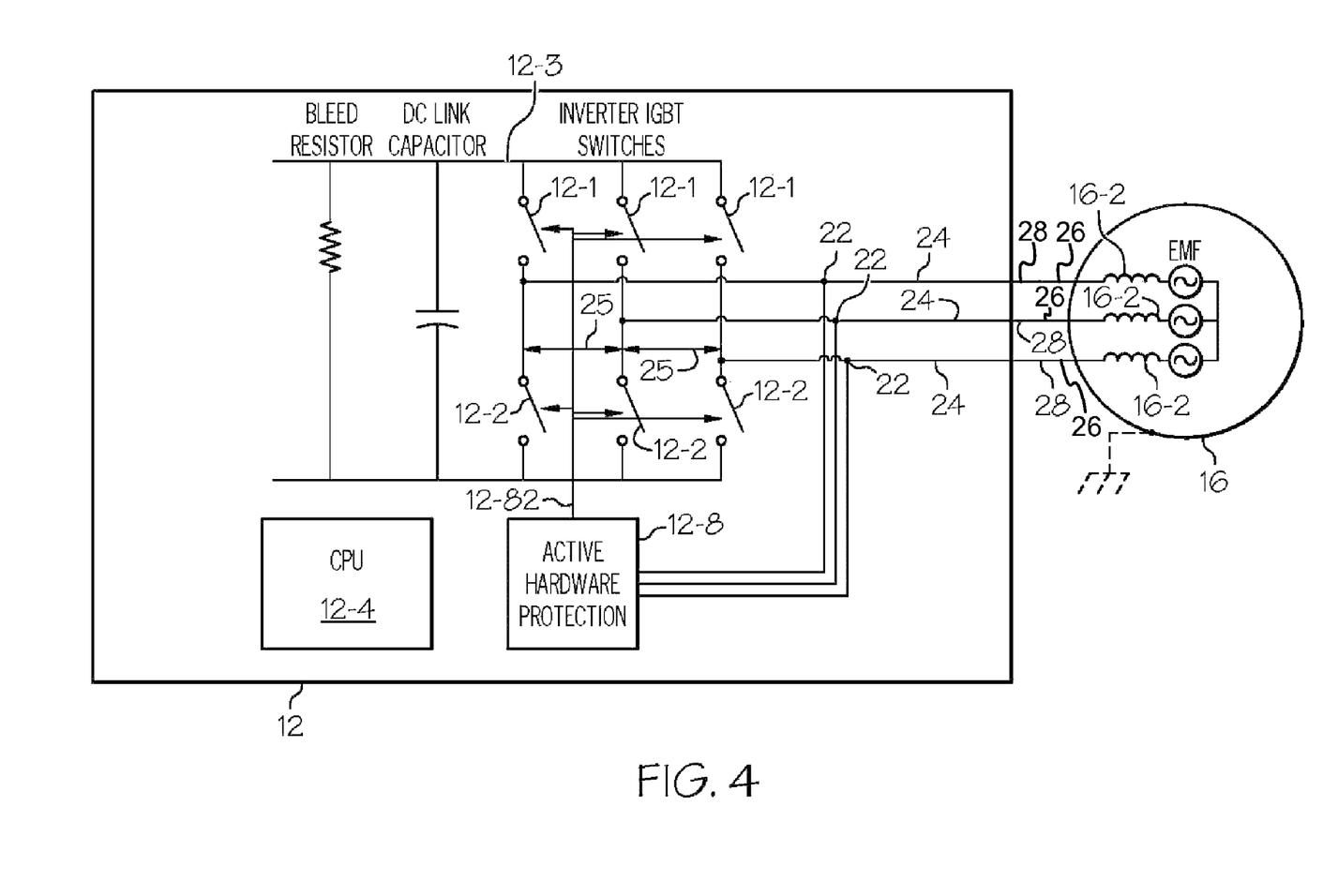
FIG. 4 is a block diagram of a drive system in accordance with a second embodiment of the present invention.

Referring now to FIG. 4 another exemplary embodiment of the invention may be illustrated. A hardware switch controller 12-8 may be placed in the controller 12. The switch controller 12-8 may incorporate the monitoring functions of the monitoring circuit 12-6 of FIG. 2 and may also provide gating signals 12-82 to the IGBT's 12-1 and 12-2 in the event of a fault condition. The gating signals 12-82 may override conventional steady gating signals produced by the processor 12-4 so that a SSCF may be produced. By incorporating the hardware switch controller 12-8 in the controller 12, a desirable degree of added safety may be provided as compared to the controller configuration of FIG. 2. The switch controller 12-6 may perform the function of converting a NSSCF to a SSCF without using software of the processor 12-4 of FIG. 2. Thus the electric machine 11 may be provided with protection even if a software failure in the processor 12-4 were to occur.

Figure 5:
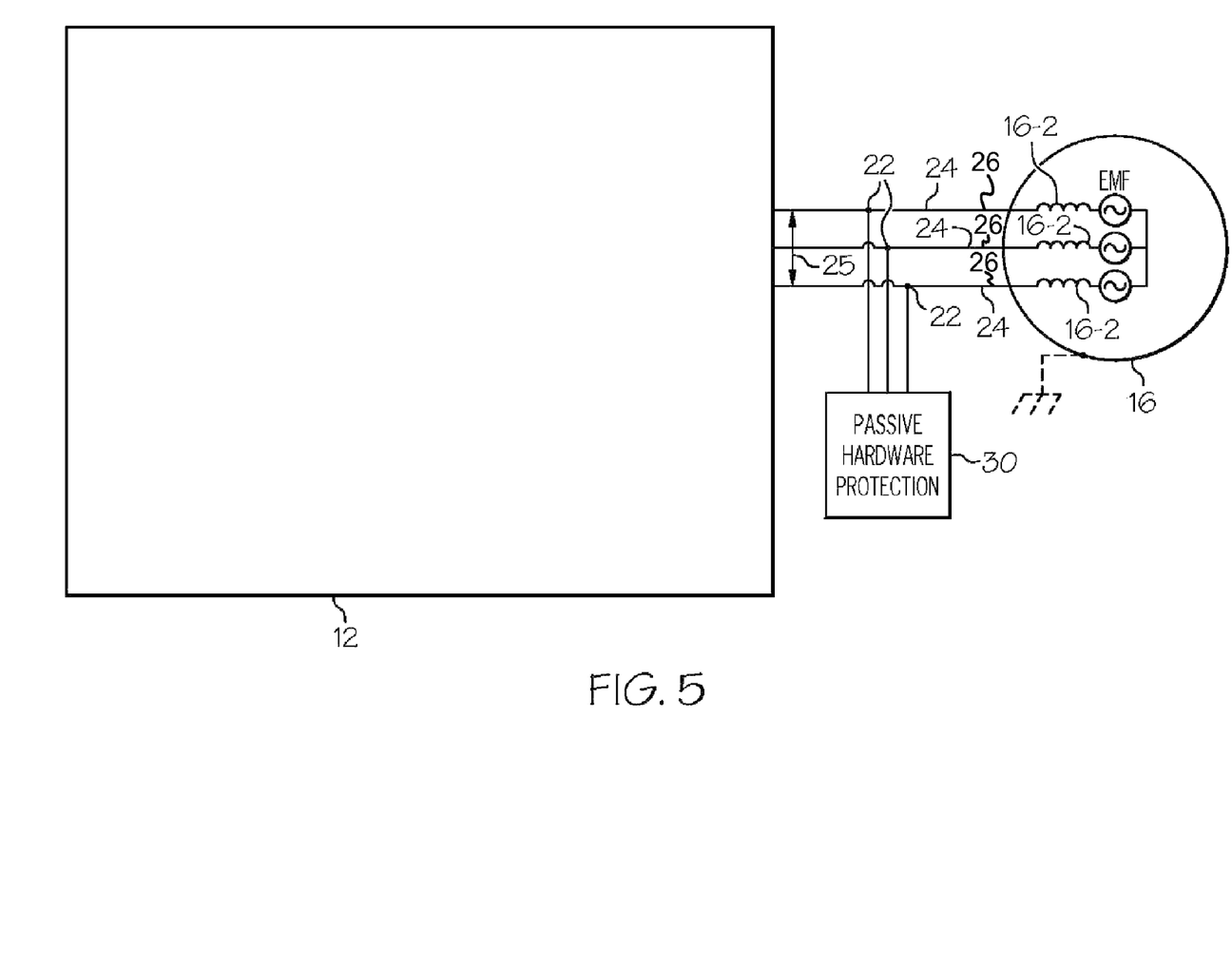
FIG. 5 is a block diagram of a drive system in accordance with a third embodiment of the present invention.

Referring now to FIG. 5, another exemplary embodiment of the invention may be illustrated. In FIG. 5, a fault converter 30 is shown connected to the conduction paths 28. The fault converter 30 may be placed externally of the controller 12. The fault converter 30 may function as a controller and may incorporate the monitoring functions of the monitoring circuit 12-6 of FIG. 2. The fault converter may provide the selectable interconnection path 25 between all of the conduction paths 28 in the event of a NSSCF. By incorporating the fault converter 30 in the electric machine 11, a desirable degree of added safety may be provided as compared to the controller configurations of FIG. 2 or 4. The external fault converter 30 may perform the function of converting a NSSCF to a SSCF independently from the controller 12. Thus the electric machine 11 may be provided with protection even if a functional failure in the controller 12 were to occur. It should be noted that the fault converter 30 may be employed in the electric machine 11 even if the electric drive system 10 is provided with fault conversion capability through the processor 12-4 of FIG. 2 and/or the switch controller 12-8 of FIG. 4. Indeed, such a redundant arrangement may be desirable in critical applications such as aircraft or other aerospace vehicles.

In one embodiment of the present invention, a method 600 may be provided for controlling an electric machine. A flow chart of the method 600 may be illustrated in FIG. 6. In a step 602, a rotor of a synchronous electric machine may be rotated (e.g., the rotor 14 of the electric machine 11 may be rotated). In a step 604, current may be transferred on multiple conduction paths (e.g. power to or from the stator windings 16-2 may be transferred along the conduction paths 24).

Figure 6:
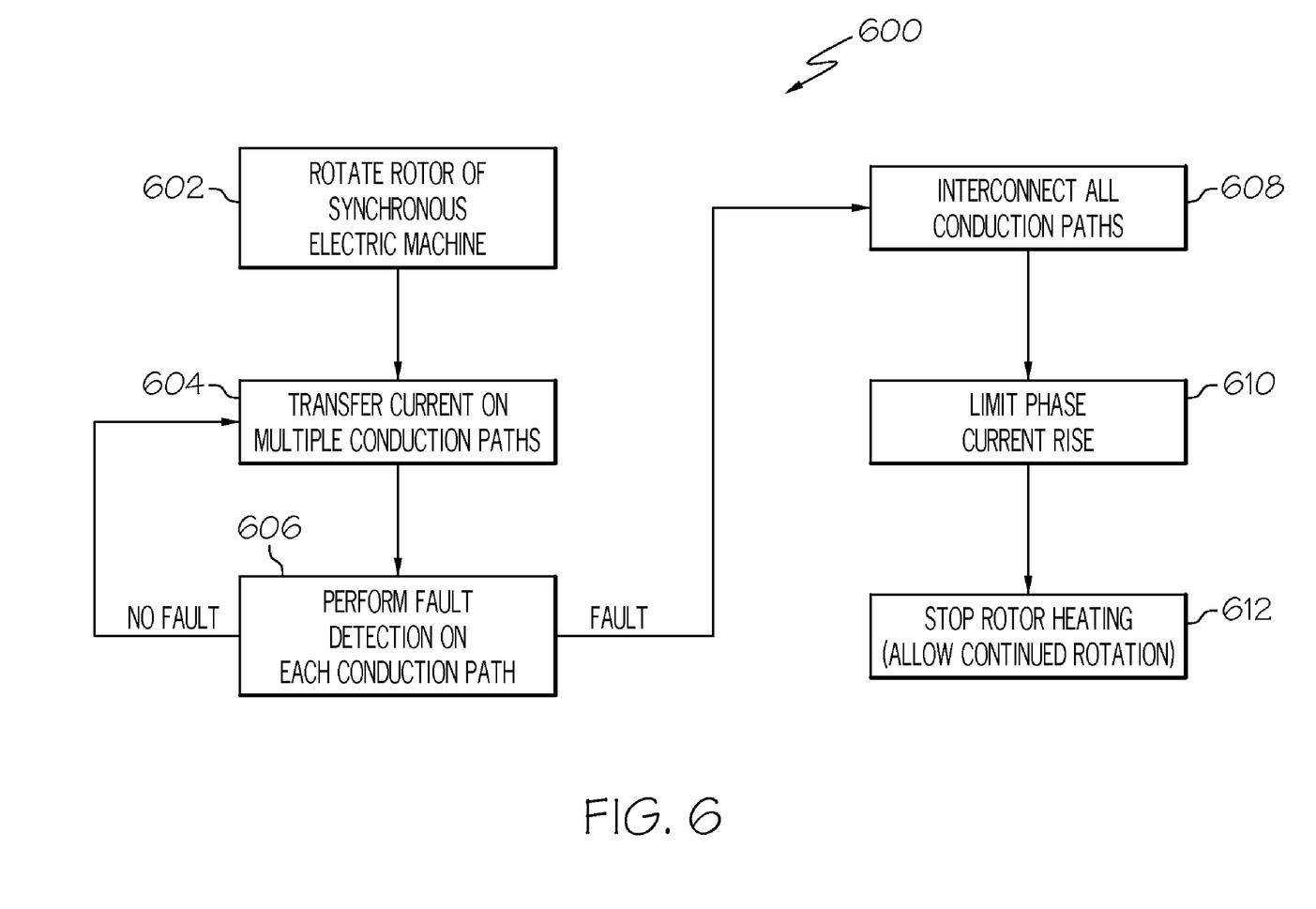
FIG. 6 is a flow chart of a method for controlling a drive system machine in accordance with an embodiment of the present invention.

In a step 606, detection of electrical faults may be performed on each of the conduction paths (e.g., one or more of the monitoring circuit 16-6, the switch controller 12-8 or the external fault converter 30 may monitor the conduction paths 24 for predetermined indications of electrical faults wherein excessive currents may be indicative of a short circuit and excessive voltage may be indicative of an arc fault). Steps 604 and 606 may be performed repeatedly unless and until an electrical fault is found. In the event of a fault condition, a step 608 may be performed to electrically interconnect all of the conduction paths (e.g., gating signals may be produced to close all of the IGBT's 12-1 and/or all of the IGBT's 12-2). Upon performance of step 608, a step 610 may be performed to limit phase current rise (e.g., the method described in U.S. Pat. No. 7,116,083 may be initiated to limit phase current in the windings 16-2). In a step 612, the rotor may be allowed to continue rotation without experiencing heating from negative sequence effects.

It should be understood, of course, that the foregoing relates to exemplary embodiments of the invention and that modifications may be made without departing from the spirit and scope of the invention as set forth in the following claims.

We claim:

1. A drive system for a multi-phase electric machine with a permanent magnet rotor, the drive system comprising:
   conduction paths for each phase;
   detectors on each of the conduction paths for determining electrical condition of the conduction path;
   at least one selectable interconnection path between all of the conduction paths; and
   at least one selectable interconnection path being operable to connect all of the conduction paths together responsively to at least one of the detectors determining that the electrical condition of its respective conduction path is representative of a predetermined electrical fault condition, so that heating of the rotor during continued rotation of the rotor is prevented; and
   a current controller including:
      solid-state switches interconnected to comprise the selectable interconnection path between all of the conduction paths;
      a processor for providing gating signals for normal operating control of the electric machine in an absence of the predetermined electrical fault condition; and
      a switch controller for monitoring the detectors and producing gating signals to the solid-state switches to produce the selectable interconnection path with the solid-state switches,
   wherein the switch controller operates independently from any software of the processor.

2. The system of claim 1,
   wherein the processor provides gating signals for normal operating control of the electric machine in an absence of the predetermined electrical fault condition.

3. The system of claim 2 further comprising a fault converter interconnected with all of the conduction paths for producing the selectable interconnection path independently of operation of the current controller whereby the electric machine is provided with redundant protection.

4. The system of claim 3 wherein the fault converter is positioned externally from the current controller.

5. The system of claim 1 wherein the selectable interconnection path is produced responsively to a short circuit fault in one or more of the conduction paths.

6. The system of claim 1 wherein the selectable interconnection path is produced responsively to an arc fault in one or more of the conduction paths.

7. A multi-phase electric machine drive system in a non-detachable relationship with a high-inertia load or a prime mover, comprising:
   a rotor;
   a stator;
   detectors for detecting an electrical fault in a plurality of conduction paths, each conduction path associated with a phase;
   a controller for electrically interconnecting all of the conduction paths responsively to detection of a fault in any of the conduction paths so that any negative sequence current resulting from the fault and continued rotation of the rotor is converted to positive sequence current, the controller comprising an inverter; and
   a fault converter that produces an interconnection of all of the conduction paths responsively to detection of the fault in any of the conduction paths,
   wherein the interconnection of all of the conduction paths is produced in the inverter, and
   wherein the fault converter acts redundantly to the inverter.

8. The system of claim 7 wherein the rotor is a permanent magnet rotor.

9. The system of claim 8 wherein the electric machine is a high reactance permanent magnet machine (HRPPM).

10. The system of claim 7 wherein the interconnection of all of the conduction paths is produced responsively to faults that produce abnormal current and faults that produce abnormal voltage.

11. A method for controlling a synchronous electric machine, comprising:
    rotating a permanent magnet rotor of the electric machine;
    transferring current to or from stator windings, said transferring being performed on multiple conduction paths;
    monitoring each of the conduction paths individually for presence of a predetermined electrical fault condition; and
    electrically interconnecting all of the conduction paths in a presence of the predetermined fault condition on any one or more of the conduction paths to assure that negative sequence currents do not produce heating of the rotor, wherein the electrical fault is an arc fault.

12. The method of claim 11 wherein the predetermined electrical fault is an excessive current.

13. The method of claim 12 wherein the predetermined electrical fault is a short circuit in one or more of the conduction paths.

14. The method of 11 wherein the predetermined electrical fault is an excessive voltage.

15. The method of claim 11 wherein the step of electrically interconnecting the conduction paths comprises producing gating signals to an inverter so that solid state switches of the inverter produce a first interconnection path.

16. The method of claim 15 further comprising producing a second interconnection path among the conduction paths redundant to the first interconnection path.

* * * * *